US006783312B2

(12) United States Patent
Smith

(10) Patent No.: US 6,783,312 B2
(45) Date of Patent: Aug. 31, 2004

(54) LASHING SYSTEM

(76) Inventor: Charles R. Smith, P.O. Box 829, Taylor, AZ (US) 85939

( * ) Notice: Subject to any disclaimer, the term of this patent is extended or adjusted under 35 U.S.C. 154(b) by 0 days.

(21) Appl. No.: 10/411,623

(22) Filed: Apr. 9, 2003

(65) Prior Publication Data

US 2003/0190209 A1 Oct. 9, 2003

Related U.S. Application Data

(60) Provisional application No. 60/371,472, filed on Apr. 9, 2002.

(51) Int. Cl.[7] .................................................. B60P 7/08
(52) U.S. Cl. .................... 410/97; 410/100; 410/104; 410/116; 296/100.15
(58) Field of Search ........................ 410/97, 100, 106, 410/116, 104; 24/265 CD, 115 K; 248/499; 296/100.15, 100.16

(56) References Cited

U.S. PATENT DOCUMENTS

| 2,455,237 | A | * | 11/1948 | Davis ........................... 410/97 |
| 3,173,539 | A | * | 3/1965 | Looker |
| 3,972,500 | A | * | 8/1976 | Johnson et al. ................ 410/85 |
| 5,050,924 | A | * | 9/1991 | Hansen ................... 296/100.15 |
| 5,118,232 | A | * | 6/1992 | Shuker ......................... 410/98 |
| 5,388,938 | A | * | 2/1995 | Helton ........................ 410/101 |
| 5,416,956 | A | * | 5/1995 | Rubin |
| 5,533,848 | A | * | 7/1996 | Davis .......................... 410/105 |
| 5,553,981 | A | * | 9/1996 | Braden ........................ 410/116 |
| 5,674,033 | A | * | 10/1997 | Ruegg .......................... 410/104 |
| 5,860,777 | A | * | 1/1999 | Walsh et al. ................. 410/100 |
| 6,152,664 | A | * | 11/2000 | Dew et al. ................... 410/100 |
| 6,168,360 | B1 | * | 1/2001 | Knox ............................ 410/96 |
| 6,419,433 | B1 | * | 7/2002 | Chou ............................ 410/97 |
| 6,511,117 | B1 | * | 1/2003 | Henning ................. 296/100.15 |

* cited by examiner

Primary Examiner—Stephen Gordon
(74) Attorney, Agent, or Firm—Martin L. Stoneman

(57) ABSTRACT

An improved lashing system for use with open-bed transport cargo. More specifically, an efficient system for the manual tie-down of tarpaulins or netting used to protect flatbed trailer cargo. The system comprises a plurality of hook-shaped cord positioning components, adjustably supported on the perimeter side rail of a flatbed trailer. The hook-shaped components allow a lasher to secure the tie-down cord of the tarp or net by simple looping action over a rod or similar open member.

27 Claims, 6 Drawing Sheets

LASHING SYSTEM

CROSS-REFERENCE TO RELATED APPLICATION

The present application is related to and claims priority from applicant's prior U.S. Provisional Application Ser. No. 60/371,472, filed Apr. 9, 2002, entitled "LASHING SYSTEM", the contents of which are herein incorporated by reference and are not admitted to be prior art with respect to the present invention by their mention in this cross-reference section.

BACKGROUND

This invention relates to providing an improved lashing system for tarping or covering of open-bed cargo transport cargo. More specifically, this invention relates to an efficient system for manual tarping or covering of flatbed trailer cargo.

A substantial number of shipping transporters, including trucks, trailers, and rail cars are of an open-air or open-bed type. Frequently, the cargos carried by open-air transporters can be damaged during transit by snow, rain and dirt, and require the use of temporary weather-resistant coverings. In addition, it is often desirable to cover dusty or lightweight open-air cargo to assist in retaining the cargo within a transporter.

Typically, tarpaulins (tarps) are used to cover the cargo of open-air transporters during shipping. Most tarp coverings are manually installed and removed by one or more cover-installing personnel (lashers). As an example, tarping or covering the cargo of a flatbed trailer, such as the type commonly used for over-the-road shipping, requires the lasher to lace the tarp to a stationary member on the trailer, typically, a perimeter side rail (also referred to as a rub/tie rail). Such operations are typically time-consuming, requiring the lasher to repeatedly interlace a rope or other lashing cord between D-rings sewn to the outer face of the tarp and openings in, and between, the fixed side rails of the trailer. Cord threading is especially difficult in conditions of snow where the installer's hand dexterity is limited by thermally-protective gloves. During the tarping process, a large portion of the lasher's time is often spent positioning the cord to achieve the most secure, smooth and aerodynamic cover placement.

In an attempt to speed the cord-lacing process, a number of transport operators have employed an arrangement of equally spaced C-shaped hooks welded to the underside of the transport. Use of the C-shaped hooks allows the lasher to pre-install a cord on the tarp and quickly secure the tarp by engaging loops of cord over the hooks prior to cinching, thereby eliminating the tedious process of repeated end-of-cord threading and lacing. The use of C-shaped hooks, while a highly desirable improvement over the slow and repetitive process of end-of-cord threading and lacing, has a distinct disadvantage in that the positioning of the tarp cord is limited by the number and position of the fixed C-shaped hooks. Typically, C-shaped hooks are generally welded to the perimeter of the trailer at a frequency of about two to three feet on center. Due to the inherent variability in cargo size and load positioning, in most instances, optimal cord positioning cannot be achieved with a fixed hook system.

From the above discussion, it is clear that an efficient, highly-adjustable and inexpensive cord system could be of great benefit to the cargo shipping industry.

OBJECTS AND FEATURES OF THE INVENTION

A primary object and feature of the present invention is to provide a system for the efficient covering of open-bed transport cargo and for use with similar protective systems. It is a further object and feature of the present invention to provide such a system that provides selectively adjustable cover-cord positioning and securing. It is a further object and feature of the present invention to provide such a system that allows a lasher to secure the lashing (cord) to a stationary structure utilizing a simpler method of looping the lashing around (under or over) a rod or similar open member.

It is a further object and feature of the present invention to provide such a system that is quickly and easily removable from the open-bed transport system without the use of tools. It is a further object and feature of the present invention to provide such a system that equally distributes the tie-down forces across the cover; to increase the aerodynamics of the cargo during transit, reduce the wear and tear on the cover material, and to reduce the cover adjustment time required to achieve an optimal cover position. A further primary object and feature of the present invention is to provide such a system that is efficient, inexpensive and handy. Other objects and features of this invention will become apparent with reference to the following descriptions.

SUMMARY OF THE INVENTION

In accordance with another preferred embodiment hereof, this invention provides a lashing system for use by a lasher with at least one tie-down cord on an open-bed cargo transport system having at least one fixed side rail peripheral portion, the system comprising, in combination: unitary rigid positioner means for firmly positioning at least one looped portion of the at least one tie-down cord; wherein such positioner means comprises slide means for assisting slideability of the at least one looped portion with respect to such positioner means; and wherein such positioner means further comprises horizontally-lasher-positionable support means for removable support of such positioner means by the at least one fixed side rail peripheral portion. Moreover, it provides such a lashing system wherein such positioner means comprises: blocker means for blocking upward movement, with respect to such positioner means, of the at least one looped portion of the at least one tie-down cord.

In accordance with another preferred embodiment hereof, this invention provides a tarpaulin lashing system for use by a lasher with at least one tie-down cord on an open-bed cargo transport system having at least one fixed side rail peripheral portion, the system comprising, in combination: at least one unitary rigid positioner structured and arranged to firmly position at least one looped portion of the at least one tie-down cord; wherein such at least one unitary rigid positioner comprises at least one slide surface structured and arranged to assist slideability of the at least one looped portion with respect to such at least one unitary rigid positioner; wherein such at least one unitary rigid positioner comprises at least one support structured and arranged to be removably supported by the at least one fixed side rail peripheral portion; and wherein such at least one support is structured and arranged to be horizontally-positionable by the lasher to a lasher-selected position.

Additionally, it provides such a tarpaulin lashing system wherein such at least one unitary rigid positioner comprises at least one blocker structured and arranged to block upward movement, with respect to such at least one unitary rigid positioner, of the at least one looped portion of the at least one tie-down cord. Also, it provides such a tarpaulin lashing system wherein such at least one support comprises: at least one essentially U-shaped plate; wherein such at least one essentially U-shaped plate is structured and arranged to fit over the top of the at least one fixed side rail. In addition, it provides such a tarpaulin lashing system wherein such at least one blocker comprises at least one substantially vertical bar. And, it provides such a tarpaulin lashing system wherein such at least one substantially vertical bar is weldably attached to at least one exterior surface of such at least one essentially U-shaped plate.

Further, it provides such a tarpaulin lashing system wherein such at least one essentially U-shaped plate and such at least one substantially vertical bar are comprised primarily of metal. Even further, it provides such a tarpaulin lashing system wherein such metal comprises primarily steel. Moreover, it provides such a tarpaulin lashing system wherein such metal is primarily non-ferrous. Additionally, it provides such a tarpaulin lashing system wherein such at least one essentially U-shaped plate and such at least one substantially vertical bar are formed from a single plate. Also, it provides such a tarpaulin lashing system wherein such single plate is primarily metal. In addition, it provides such a tarpaulin lashing system wherein such at least one essentially U-shaped plate and such at least one substantially vertical bar are molded as one unit. And, it provides such a tarpaulin lashing system wherein such at least one essentially U-shaped plate and such at least one substantially vertical bar are comprised of metal.

Even further, it provides such a tarpaulin lashing system wherein such at least one essentially U-shaped plate and such at least one substantially vertical bar are comprised primarily of steel. Even further, it provides such a tarpaulin lashing system wherein such metal is primarily non-ferrous. Moreover, it provides such a tarpaulin lashing system wherein such at least one essentially U-shaped plate and such at least one substantially vertical bar are comprised primarily of plastic. Additionally, it provides such a tarpaulin lashing system wherein: such at least one essentially U-shaped plate and such at least one substantially vertical bar are comprised of at least two separate materials; and such at least one essentially U-shaped plate and such at least one substantially vertical bar are joined to form a unitary structure. Also, it provides such a tarpaulin lashing system wherein such at least one portion of such at least one essentially U-shaped plate is comprised primarily of plastic.

Moreover, it provides such a tarpaulin lashing system wherein: at least one lower portion of such at least one substantially vertical bar comprises such at least one slide surface; and such at least one slide surface is essentially rounded. And, it provides such a tarpaulin lashing system wherein at least one lower surface portion of such at least one substantially vertical bar forms a right round cylinder. Further, it provides such a tarpaulin lashing system wherein at least one lower portion of such at least one substantially vertical bar comprises at least one essentially U-shaped hook. Even further, it provides such a tarpaulin lashing system further comprising at least one fixed side rail. Even further, it provides such a tarpaulin lashing system further comprising at least one flat-bed trailer attached with such at least one fixed side rail. Even further, it provides such a tarpaulin lashing system further comprising at least one tarpaulin having at least one tarpaulin cord system. Even further, it provides such a tarpaulin lashing system further comprising at least one truck tractor attached with such at least one flat-bed trailer attached with such at least one fixed side rail.

In accordance with another preferred embodiment hereof, this invention provides a tarpaulin lashing system for use by a lasher with at least one tie-down cord on an open-bed cargo transport system comprising at least one fixed longitudinal rail portion, the system comprising, in combination: at least one unitary rigid positioner structured and arranged to firmly position at least one looped portion of the at least one tie-down cord; wherein such at least one unitary rigid positioner comprises at least one slide surface structured and arranged to assist slideability of the at least one looped portion with respect to such at least one unitary rigid positioner; wherein such at least one unitary rigid positioner comprises at least one support structured and arranged to be removably supported by the at least one fixed longitudinal rail portion; and wherein such at least one support is structured and arranged to be horizontally-positionable by the lasher to a lasher-selected position.

DETAILED DESCRIPTION OF A PREFERRED EMBODIMENT OF THE INVENTION

Figure 1:
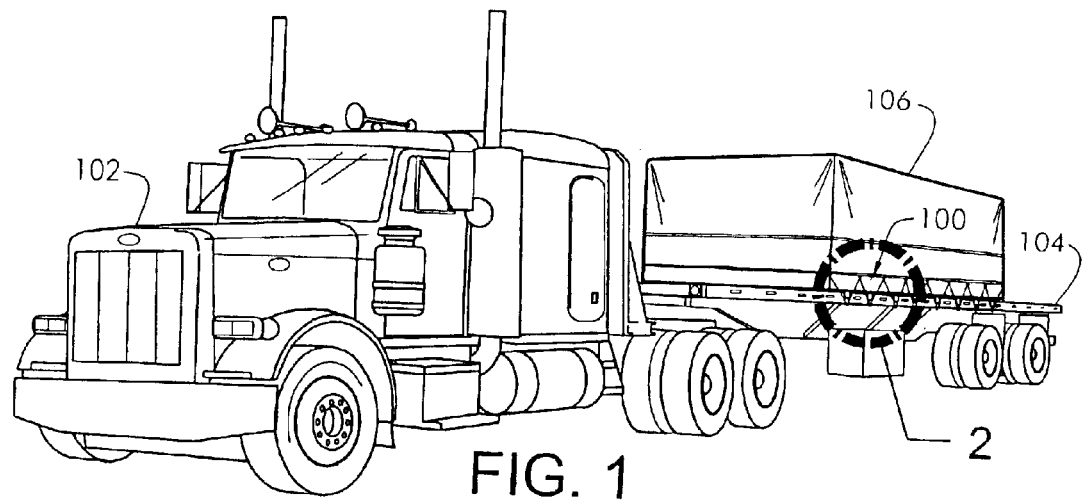
FIG. 1 is a perspective view of a truck and flatbed trailer with a tarp secured with the lashing system according to a preferred embodiment of the present invention.

FIG. 1 is a perspective view of a truck 102 and flatbed trailer 104 with a tarp 106 secured with the lashing system 100 according to a preferred embodiment of the present invention. Preferably, the flatbed trailer 104 depicted in FIG. 1 is a preferred application of the present invention; however, it should be noted that under appropriate circumstances, lashing system 100 may be used with other cargo transport systems, such as rail cars, local cargo-movers, shipping pallets, etc. Those skilled in the art, upon reading the teachings of this specification, will appreciate that, under appropriate circumstances, considering such issues as weather-resistant cargo or weather conditions, other types of covers, such as netting, ropes, etc., may be used with lashing system 100.

Figure 2:
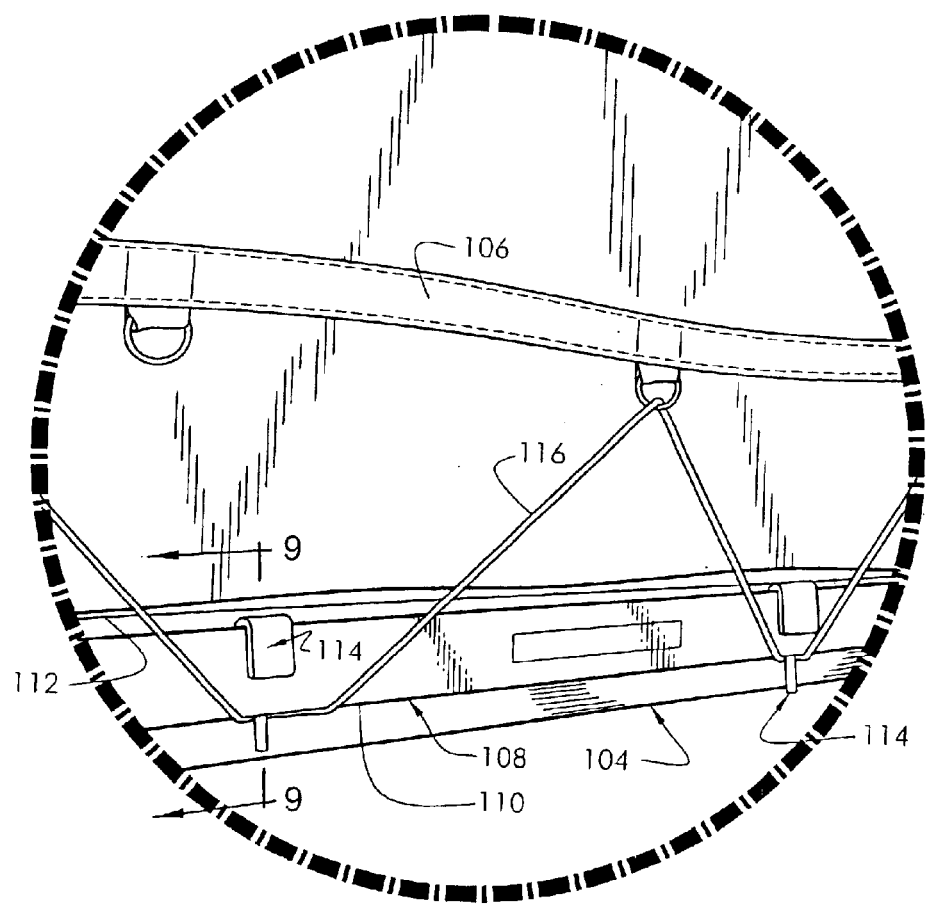
FIG. 2 is a detailed perspective view of the lashing system of FIG. 1.

FIG. 2 is a detail perspective view of the lashing system of FIG. 1. FIG. 2 illustrates the flatbed trailer 104 with a cargo tarpaulin 106 (herein referred to as a tarp) secured using the lashing system 100. Preferably, the flatbed trailer 104 (or Driver or Tractor) comprises a tarpaulin assembly further comprising a tarpaulin 106 and tarpaulin cord system 116 (herein referred to as a tarp-cord), as shown (embodying herein at least one tarpaulin having at least one tarpaulin cord system). Preferably, the flatbed trailer 104 is equipped with at least one fixed perimeter side rail 108 (also commonly referred to as a rub/tie rail and embodying herein at least one fixed side rail), as shown. Preferably, the side rail 108 is typically formed from a flat steel or aluminum side rail bar 110 spaced about two to three inches away from the perimeter edge 112 of the flatbed trailer 104, as shown. Preferably, at least one unitary, removable lashing assembly 114 (herein embodying unitary rigid positioner means and embodying at least one unitary rigid positioner) is supported by the upper edge of the side rail bar 110, as shown. Preferably, at least one loop of the tarp-cord 116 is positioned such that the tarp-cord 116 hooks over the lashing assembly 114, as shown. Preferably, a plurality of lashing assemblies 114 is used to secure the cargo tarp 106 along the side rail 108, as shown. Preferably, lashing system 100 comprises at least one lashing assembly 114; however, in practical application, a plurality of lashing assemblies 114 is used. The number of lashing assemblies 114 within a given lashing system 100 is dependant upon factors such as the size of the transport and the types of cargo carried. In the illustrated example of flatbed trailer 104 in FIG. 1 and FIG. 2, about 60 lashing assemblies 114 are used to lash a typical cargo load. It is within the scope of the present invention to supply the lashing system 100 as a kit having a specific number of lashing assemblies 114 to match the average requirements of a general or specific cargo transport system. Those skilled in the art, upon reading the teachings of this specification, will appreciate that, under appropriate circumstances, considering such issues as marketability studies, accommodation for specific flatbed trailers, requests by cargo companies, cost, ease of manufacturing, etc., other types of kits for lashing system 100, such as different styles and shapes of lashing assemblies 114, indicia, etc., may suffice.

Figure 3:
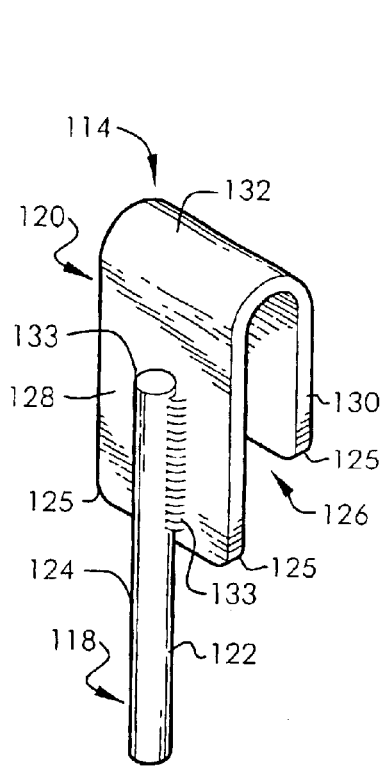
FIG. 3 is a perspective view of a lashing assembly according to a preferred embodiment of the present invention.

FIG. 3 is a perspective view of a lashing assembly 114 according to a preferred embodiment of the present invention. Preferably, lashing assembly 114 comprises two primary components, at least one cord-positioning member 118 for positioning at least one looped portion of tie-down cord 116 (this arrangement embodies herein wherein said positioner means comprises blocker means for blocking upward movement, with respect to said positioner means, of the at least one looped portion of the at least one tie-down cord; and embodies herein wherein said at least one unitary rigid positioner comprises at least one blocker structured and arranged to block upward movement, with respect to said at least one unitary rigid positioner, of the at least one looped portion of the at least one tie-down cord), and at least one support member 120 for supporting the cord positioning member 118 on the side rail bar 110 (this arrangement embodies herein wherein said positioner means further comprises horizontally-lasher-positionable support means for removable support of said positioner means by the at least one fixed side rail peripheral portion; and, embodies herein, wherein said at least one unitary rigid positioner comprises at least one support structured and arranged to be removably supported by the at least one fixed side rail peripheral portion). In the embodiment of FIG. 3, cord-positioning member 118 preferably comprises at least one rigid vertically-oriented rod 122 (embodying herein wherein at least one lower surface portion of said at least one substantially vertical bar forms a right round cylinder), preferably comprising metal, preferably comprising an essentially cylindrical steel rod having a diameter of about three-eighths of an inch and a length of about four inches, as shown. Preferably, contact with the tie-down cord 116 occurs on at least one smooth surface portion 124 (this arrangement embodies herein wherein said positioner means comprises slide means for assisting slideability of the at least one looped portion with respect to said positioner means; and embodies herein wherein said at least one unitary rigid positioner comprises at least one slide surface structured and arranged to assist slideability of the at least one looped portion with respect to said at least one unitary rigid positioner; and further embodies wherein at least one lower portion of said at least one substantially vertical bar comprises said at least one slide surface; and embodying said at least one slide surface is essentially rounded), allowing the tie-down cord 116 to more easily slip around cord-positioning member 118, thereby assisting the lasher in performing any required adjusting/tightening movements during tarping operations.

Preferably, support member 120 comprises at least one flat, essentially U-shaped plate 126, as shown (embodying herein wherein said at least one support comprises at least one essentially U-shaped plate). Preferably, plate 126 is formed from a single piece of rigid, malleable material, preferably metal (embodying herein wherein said single plate is primarily metal), preferably at least one, three-sixteenths of an inch thick steel plate having a width of about one-and-one-half inches, and a length of about five inches, as shown. Preferably, plate 126 is bent in a brake-form machine (or similar well-known metal-forming devices) to produce the generally U-shaped support member 120, as shown. Preferably, support member 120 comprises at least one back hook portion 128 with a length of about two-and-one-fourth inches, and at least one front hook portion 130 having a length of about two inches, as shown. The back hook portion 128 and front hook portion 130 are preferably joined by at least one radius portion 132, preferably having an interior throat diameter greater than the width of the supporting side rail bar 110, preferably about one-half of an inch, as shown.

Preferably, radius portion 132 is formed to a one-hundred-eighty-degree radius; however, under appropriate circumstances, other angular positions may be used to accommodate specific support configurations. Preferably as shown, the corners 125 of plate 126 are provided with a small radius, preferably about one-forth of an inch, to assist in preventing damage to the tie-down cord 116 during use. Preferably, at least one weld 133 is located to each side of cord-positioning member 118, permanently joining cord-positioning member 118 to the exterior longitudinal midline of back hook portion 128, thereby forming the unitary lashing assembly 114, as shown (this arrangement embodies herein wherein said at least one substantially vertical bar is weldably attached to at least one exterior surface of said at least one essentially U-shaped plate). Those skilled in the art, upon reading the teachings of this specification, will appreciate that, under appropriate circumstances, considering such issues as economics, ease of manufacturing, etc., other methods to firmly join the cord-positioning member 118 to the support member 120 may suffice. Although it is presently preferred that lashing assembly 114 comprises steel components (embodying herein wherein said at least one essentially U-shaped plate and said at least one substantially vertical bar are comprised primarily of metal; and embodying herein wherein said metal comprises primarily steel), under appropriate circumstances, other rigid materials, such as plastic (embodying herein wherein said at least one essentially U-shaped plate and said at least one substantially vertical bar are comprised primarily of plastic), or non-ferrous metals (embodying herein wherein said metal is primarily non-ferrous), including aluminum, may be used. Preferably, lashing assembly 114 is given a protective finish of paint, powder-coating, plating or similar oxidation-preventing coating. Under appropriate circumstances, the finish of lashing assembly 114 may be color-coated by the factory to match a truck or trailer, or similarly, may include user-specified indicia or branding.

Figure 4:
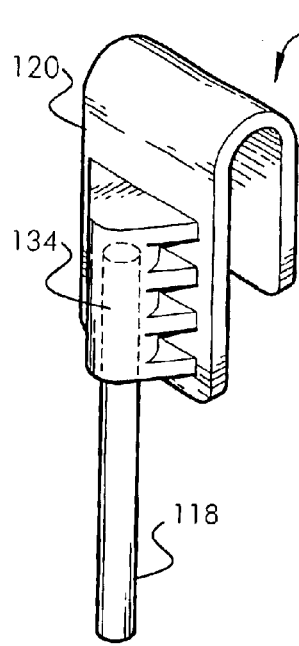
FIG. 4 is a perspective view of a lashing assembly according to another preferred embodiment of the present invention.

FIG. 4 is a perspective view of a lashing assembly 114*b*, according to another preferred embodiment of the present invention. As shown, support member 120 and cord-positioning member 118 comprise at least one dissimilar material (embodying herein wherein said at least one essentially U-shaped plate and said at least one substantially vertical bar are comprised of at least two separate materials). In the embodiment of FIG. 4, the support member 120 comprises a rigid mold-formed plastic, such as poly-vinyl chloride, and the cord-positioning member 118 comprises metal, preferably steel or aluminum. Preferably, support member 120 is mold-formed with at least one integral receiver socket 134, structured and arranged to receive and retain at least one portion of the cord-positioning member 118, as shown. Support member 120 and cord-positioning member 118 are preferably permanently joined by adhesive bonding, heat welding, or under appropriate circumstances, by press-fitting cord-positioning member 118 into receiver socket 134 to create the unitary lashing assembly 114*b* shown (this arrangement embodies herein wherein said at least one essentially U-shaped plate and said at least one substantially vertical bar are joined to form a unitary structure). It should be noted that under appropriate circumstances, cord-positioning member 118 and support member 120 (having a receiver socket 134) could be formed from identical materials.

Figure 5:
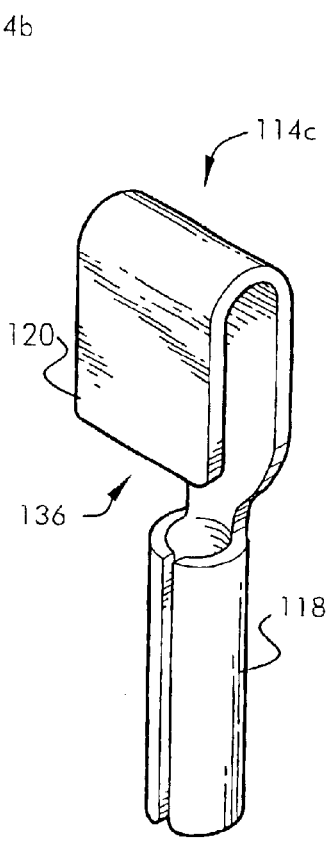
FIG. 5 is a perspective view of a lashing assembly according to another preferred embodiment of the present invention.

FIG. 5 is a perspective view of a lashing assembly 114*c* according to another preferred embodiment of the present invention. In the embodiment of FIG. 5, a single rigid plate 136 is cut and bent to form support member 120 and cord-positioning member 118, as shown (this arrangement embodies herein wherein said at least one essentially U-shaped plate and said at least one substantially vertical bar are formed from a single plate). Preferably, rigid plate 136 comprises metal, preferably steel; however, under appropriate circumstances, other rigid materials having strength and ductility characteristics similar to steel may suffice.

Figure 6:
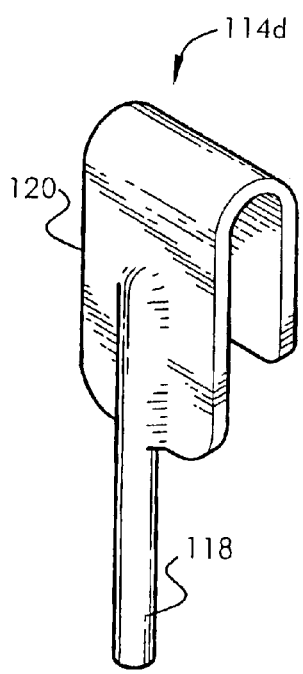
FIG. 6 is a perspective view of a lashing assembly according to another preferred embodiment of the present invention.

FIG. 6 is a perspective view of the lashing assembly 114*d* according to another preferred embodiment of the present invention. FIG. 6 shows support member 120 and cord-positioning member 118 molded as one unit to form lashing assembly 114*d* (this arrangement embodies herein wherein said at least one essentially U-shaped plate and said at least one substantially vertical bar are molded as one unit). The unitary mold-formed embodiment of lashing assembly 114*d* preferably comprises a rigid non-ferrous metal, such as aluminum. Those skilled in the art, upon reading the teachings of this specification, will appreciate that, under appropriate circumstances, considering such issues as cost, ease of manufacturing, marketability studies, etc., other materials for the mold-formed embodiment of lashing assembly 114*d*, such as hard plastic, polyvinyl chloride, etc., may suffice.

Figure 7:
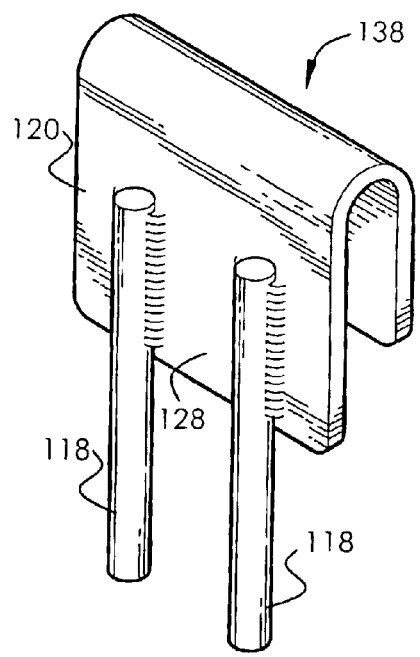
FIG. 7 is a perspective view of a double lashing assembly according to another preferred embodiment of the present invention.

FIG. 7 is a perspective view of a double lashing assembly 138 according to a preferred embodiment of the present invention. Preferably, support member 120 of double lashing assembly 138 comprises components and materials essentially identical to those described in the embodiment of FIG. 3; however, in the embodiment of FIG. 7, support member 120 is sufficiently wide to allow two cord-positioning member(s) 118 to be attached to the back hook portion 128 of double lashing assembly 138, as shown. Those skilled in the art, upon reading the teachings of this specification, will appreciate that, under appropriate circumstances, considering such issues as cost, ease of manufacturing, marketability studies, etc., other arrangements for double lashing assembly 138, such as three or more cord-positioning member(s) 118, variable widths of support member 120, variable lengths of cord-positioning member(s) 118, etc., may suffice.

Figure 8:
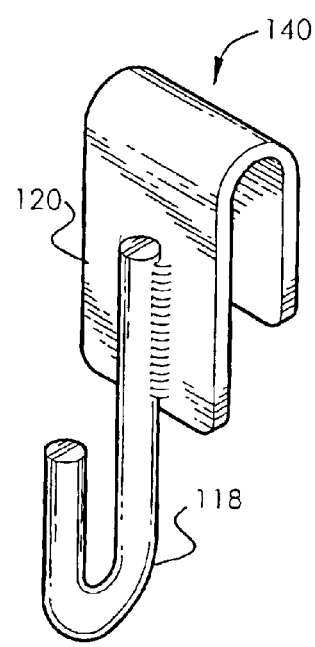
FIG. 8 is a perspective view of a lashing assembly according to another preferred embodiment of the present invention.

FIG. 8 is a perspective view of a lashing assembly according to another preferred embodiment of the present invention. FIG. 8 is a perspective view of a hook-type lashing assembly 140. Preferably, support member 120 of hook-type lashing assembly 140 comprises components and materials essentially identical to those described in the embodiment of FIG. 3; however, in the embodiment of FIG. 8, cord-positioning member 118 is bent to form at least one essentially U-shaped hook, as shown (herein embodying wherein at least one lower portion of said at least one substantially vertical bar comprises at least one essentially U-shaped hook). It is presently preferred to form a hook comprising a radius of about one-hundred-eighty-degrees; however, those skilled in the art, upon reading the teachings of this specification, will appreciate that, under appropriate circumstances, considering such issues as ease of use, marketability studies, etc., other angular positioning arrangements, etc., may suffice.

Figure 9:
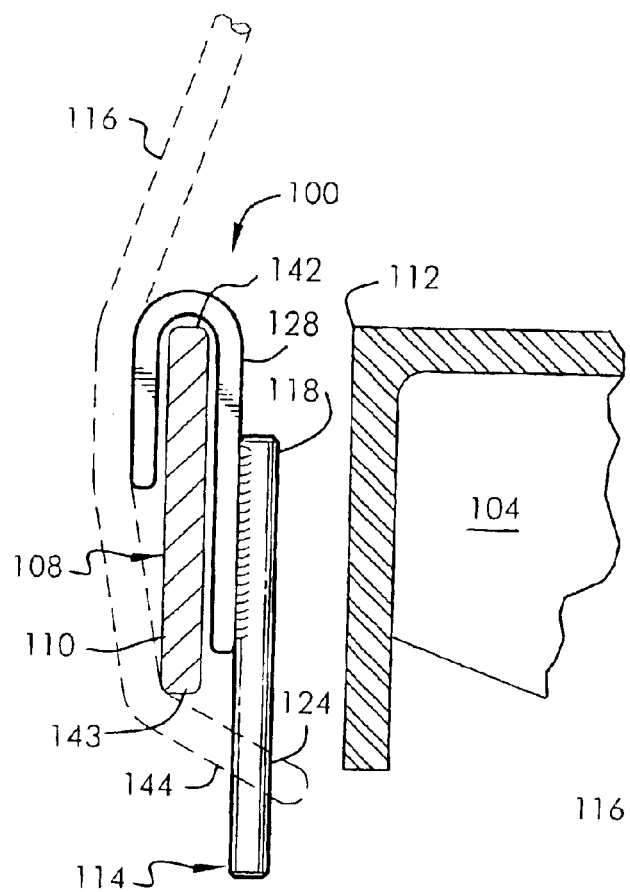
FIG. 9 is a sectional view through section 9—9 of FIG. 2.

FIG. 9 is a sectional view through section 9—9 of FIG. 2. FIG. 9 is a sectional view of the lashing system 100 supported by the side-rail 108 of a flatbed trailer 104. Preferably, lashing assembly 114 is supported from the upper portion 142 of side rail bar 110, as shown. Preferably, back hook portion 128 and cord-positioning member 118 are located in the interstitial space formed between the perimeter edge 112 of the flatbed trailer 104, and the side rail bar 110 of side rail 108, as shown. Preferably, at least one portion of cord-positioning member 118 is vertically-positioned below the bottom-portion 143 of side rail bar 110 to allow at least one loop 144 of tie-down cord 116 to be slipped over the smooth surface portion 124 of cord-positioning member 118, as shown. Preferably, as the lasher tightens tie-down cord 116, cord-positioning member 118 blocks the movement of loop 144 away from the side rail 108, as shown. Preferably, lashing assembly 114 can be located in an essentially infinite number of preferred positions along the side rail bar 110 to facilitate optimal tie-down cord positioning. Preferably, lashing assembly 114 is held in place without the use of fasteners, and is therefore removable from the side rail 108 without the use of tools, as shown. The above-described arrangement embodies herein (embodying herein wherein said at least one support is structured and arranged to be horizontally-positionable by the lasher to a lasher-selected position; and embodying herein unitary rigid positioner means for firmly positioning at least one looped portion of the at least one tie-down cord; and embodying herein at least one unitary rigid positioner structured and arranged to firmly position at least one looped portion of the at least one tie-down cord). Those skilled in the art, upon reading the teachings of this specification, will appreciate that, under appropriate circumstances, considering such issues as ease of use, marketability studies, etc., other arrangements of lashing assembly 114 may suffice.

Figure 10:
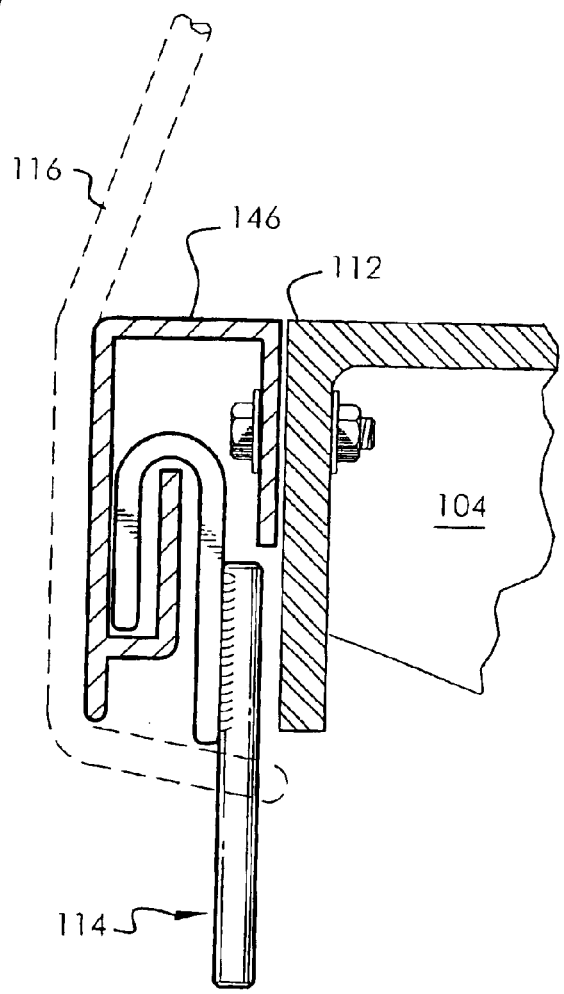
FIG. 10 is an alternate sectional view of the embodiment of FIG. 9 installed on another typical style of transport trailer side-rail.

FIG. 10 is an alternate sectional view of the embodiment of FIG. 9 installed on another typical style of transport trailer side-rail. FIG. 10 illustrates sectional view of the lashing system supported by an extruded aluminum side-rail 146. In the embodiment of FIG. 10, at least one lashing assembly 114 is held within the profile of at least one continuous extruded aluminum side rail 146 anchored to the perimeter edge 112 of flat bed trailer 104, as shown (embodying herein at least one truck tractor attached with said at least one flat-bed trailer attached with said at least one fixed side rail). Preferably, lashing assembly 114 is horizontally adjustable within extruded aluminum side rail 146 (embodying herein wherein said at least one support is structured and arranged to be horizontally-positionable by the lasher to a lasher-selected position). Preferably, the lashing assembly 114 may only be removed from the extruded aluminum side rail 146 by passing the assembly out of the side-rail end. By preferably engaging the lashing assembly 114 within the extruded aluminum side rail 146, the lashing assembly 114 may conveniently remain stored in place, as shown. Those skilled in the art, upon reading the teachings of this specification, will appreciate that, under appropriate circumstances, considering such issues as ease of use, marketability studies, etc., other arrangements of lasher assembly 114 may suffice.

Figure 11:
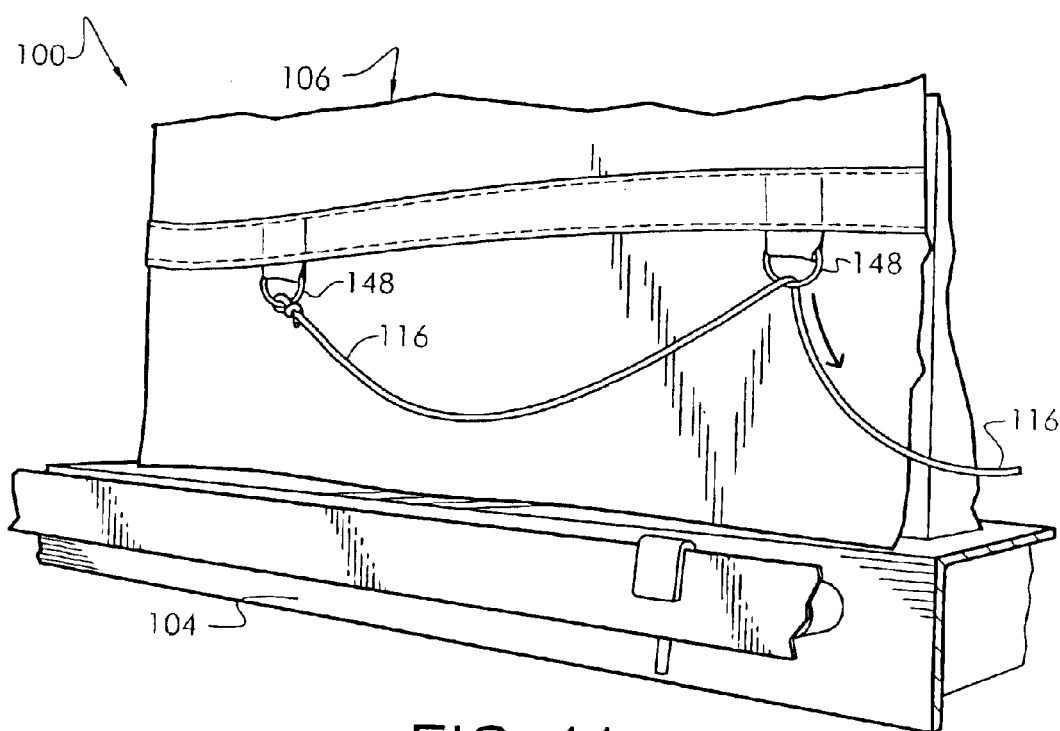
FIG. 11 is a perspective view, partially in section, illustrating a step of installing the lashing system according to a preferred embodiment of the present invention.

FIG. 11 is a perspective view, partially in section, illustrating a step of installing the lashing system according to a preferred embodiment of the present invention. FIG. 11 illustrates a flatbed trailer 104 showing the step of a tarp 106 being prepared for lashing. Typically, at least one tarp 106 is used to protectively cover the cargo (beneath tarp 106), as shown. In a common configuration, a plurality of D-rings 148, sewn to the exterior face of tarp 106, are used to retain the tie-down cord 116, as shown. Preferably, a first end of at least one tie-down cord 116 is tied to at least one D-ring 148, and the second end is threaded through the remaining plurality of D-rings 148, as shown. Those skilled in the art, upon reading the teachings of this specification, will appreciate that, under appropriate circumstances, considering such issues as lasher preference, etc., other configurations or paths of tie-down cord 116 or using less than the remaining plurality of D-rings 148 may suffice.

Figure 12:
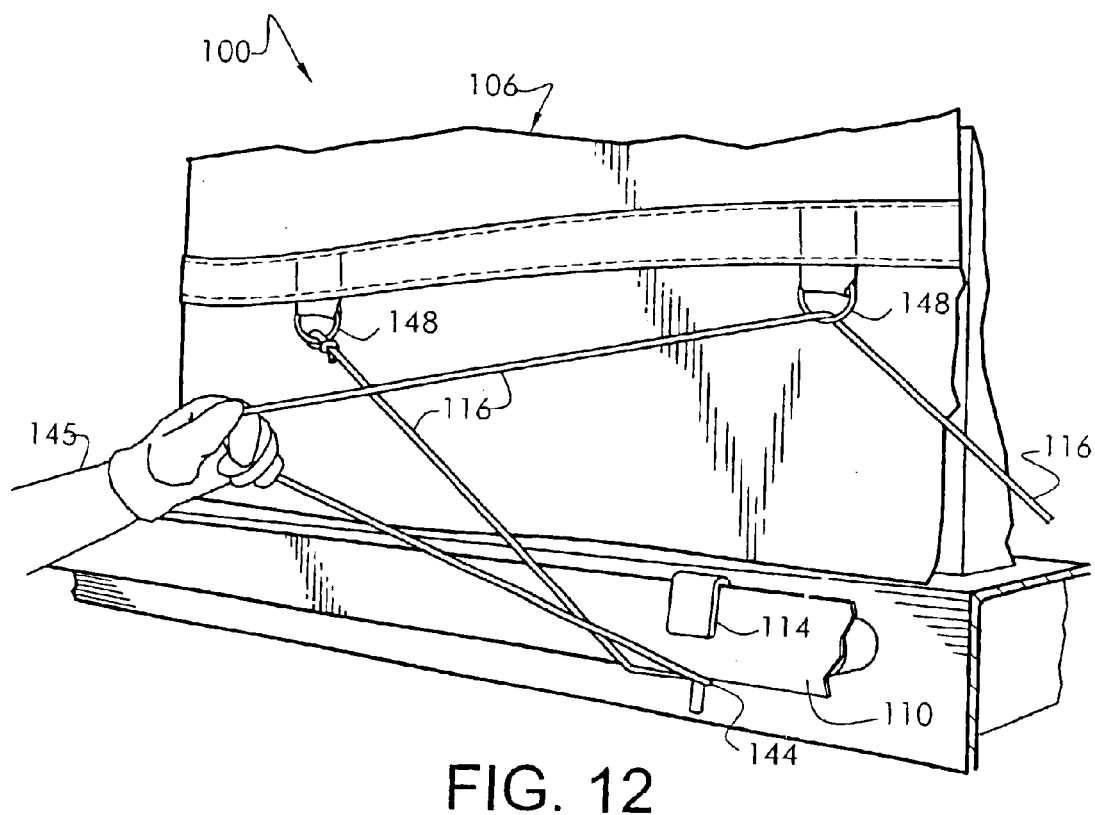
FIG. 12 is a perspective view, partially in section, illustrating another step of installing the lashing assembly according to a preferred embodiment of the present invention.

FIG. 12 is a perspective view, partially in section, illustrating another step of installing the lashing assembly according to a preferred embodiment of the present invention. FIG. 12 illustrates a flatbed trailer with loop 144 of threaded tie-down cord 116 being positioned by a lasher 145 on the lashing assembly 114. Preferably, the lasher positions the lashing assembly 114 on the side rail bar 110 equidistantly between the D-ring(s) 148 of tarp 106 to provide an optimal tie-down cord force distribution across tarp 106, but the lashing assembly 114 may be placed anywhere along the side rail bar 110. Repetitive threading of the tie-down cord between the D-rings and the fixed structures of flatbed trailer 104 is not required; therefore, the speed of securing the tarp 106 is greatly increased; additionally, the tie-down cord 116 may remain fixed to the tarp 106 to further reduce tarping time. Those skilled in the art, upon reading the teachings of this specification, will appreciate that, under appropriate circumstances, considering such issues as future design changes for tarps, D-rings, or perimeter side rails 108, other arrangements of lashing assembly 114 may suffice.

Figure 13:
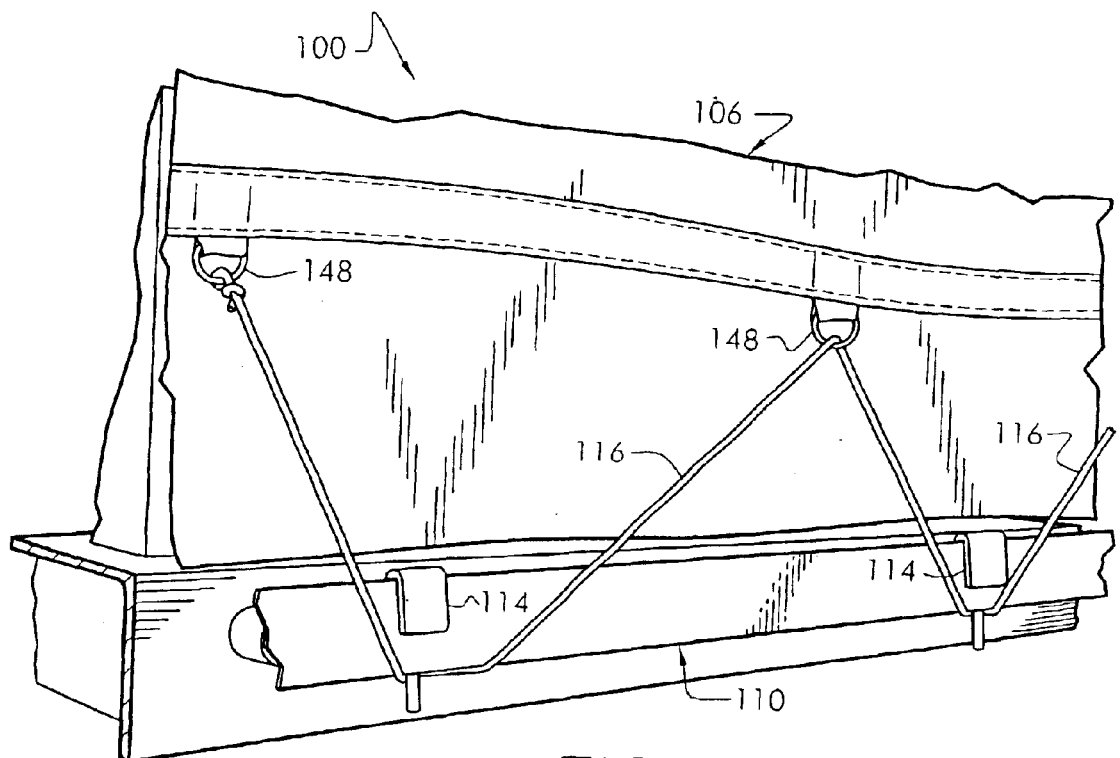
FIG. 13 is a perspective view, partially in section, illustrating the lashing system installed according to a preferred embodiment of the present invention.

FIG. 13 is a perspective view, partially in section, illustrating the lashing system installed according to a preferred embodiment of the present invention. FIG. 13 illustrates a flatbed trailer 104 showing the tarp 106 lashed in position with lashing system 100. Because the positioning of the lashing assembly 114 is highly adjustable, a lasher is afforded a high level of control in evenly distributing tie-down forces across the tarp. The ability to control the lashing forces within the tarp 106 serves to: increase the aerodynamics of the cargo during transit, reduce the wear and tear on the material of tarp 106, and to reduce the tarp adjustment time required to achieve acceptable tarp positioning. Those skilled in the art, upon reading the teachings of this specification, will appreciate that, under appropriate circumstances, considering such issues as evolving transportation law, user preference, etc., other advantages of lashing system 100 may become apparent.

Figure 14:
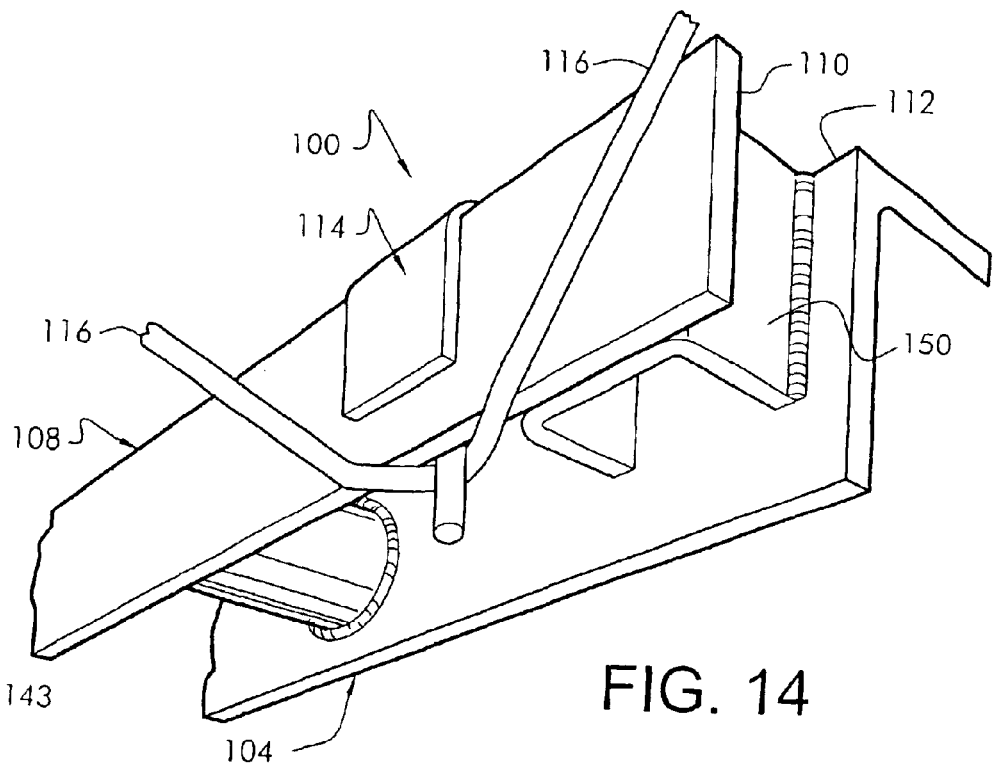
FIG. 14 is a perspective view, partially in section, illustrating the flexible uses of the lashing system adjacent other truck side-rail structures according to a preferred embodiment of the present invention.

FIG. 14 is a perspective view, partially in section, illustrating the flexible uses of the lashing system adjacent other truck side-rail structures according to a preferred embodiment of the present invention. FIG. 14 illustrates the bottom-portion 143 of side-rail 108 showing the tie-down cord 116 secured in position with the lashing assembly 114 of lashing system 100. FIG. 14 shows the stake pockets 150 typically located between the side rail bar 110 and the perimeter edge 112 of the flatbed trailer 104. Preferably, at least one embodiment of the present invention includes a lashing assembly 114 having a support member 120 with a width to fit inside the interior pocket width of the stake pockets 150. A lashing assembly of this type is especially suited to retain eccentrically loaded tie-down cords where the direction of upward force applied to the cord-positioning member 118 has a component essentially parallel with the longitudinal axis of the side rail bar 108. Those skilled in the art, upon reading the teachings of this specification, will appreciate that, under appropriate circumstances, considering such issues as future design changes of tarp 106, D-ring 148, stake pockets 150, perimeter side rail 108, etc., other arrangements of lashing assembly 114 may suffice.

Figure 15:
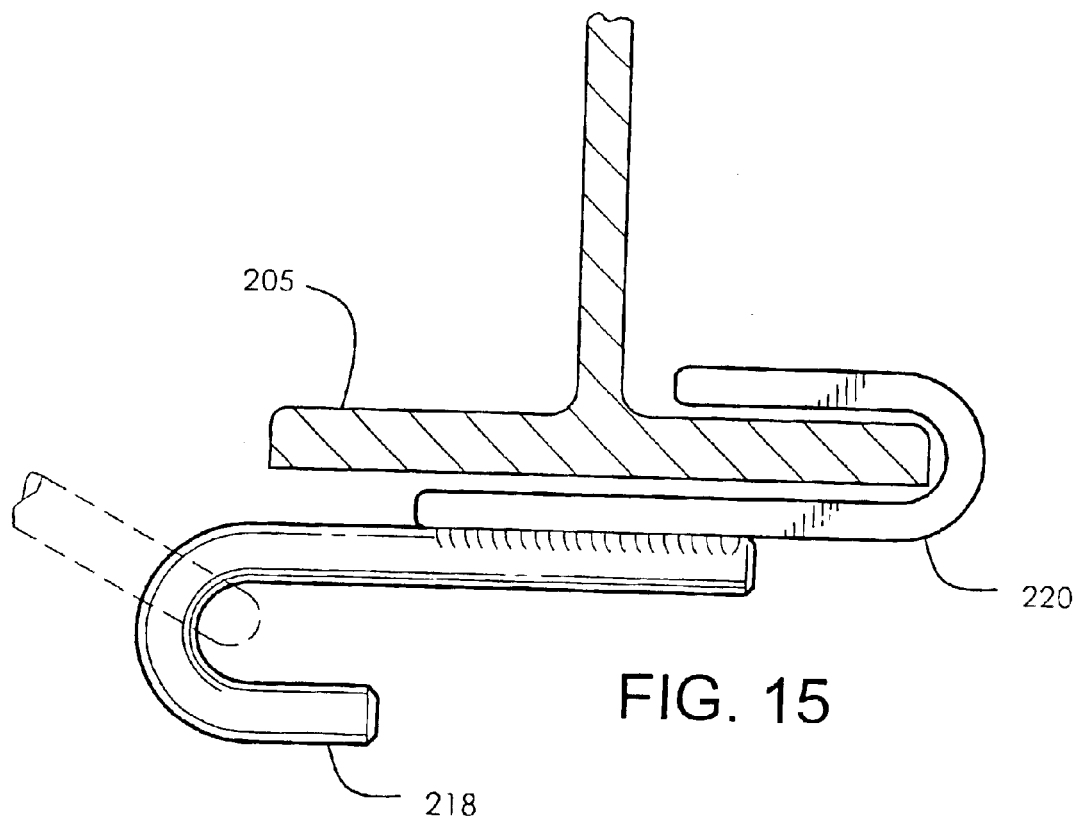
FIG. 15 is a sectional view illustrating the use of the lashing system being utilized adjacent a typical I-beam under a trailer according to another preferred embodiment of the present invention.

FIG. 15 is a sectional view illustrating the use of the lashing system being utilized adjacent a typical I-beam installed as a longitudinal support under a flat-bed (or most other) trailer according to another preferred embodiment of the present invention. FIG. 15 illustrates another preferred embodiment that may be useful or preferable under appropriate circumstances for direct lashing of a cargo load to a cargo transport system. The embodiment of FIG. 15 comprises a hook-shaped unitary support member 220 having at least one hook-shaped tie-down positioning member 218, as shown. Preferably, unitary support member 220 is structured and arranged to be supported by at least one structural portion of the transport, such as an I-beam frame rail 205, as shown. Preferably, the member 218 may be positioned anywhere along the I-beam and then utilized as taught above, to hold a cord or rope in place. Those skilled in the art, upon reading the teachings of this specification, will appreciate that, under appropriate circumstances, considering such issues as accommodation for different frame rail shapes, sizes, etc., other arrangements of unitary support member 220 may suffice. This arrangement embodies herein a tarpaulin lashing system for use by a lasher with at least one tie-down cord on an open-bed cargo transport system comprising at least one fixed longitudinal rail portion, the system comprising, in combination: at least one unitary rigid positioner structured and arranged to firmly position at least one looped portion of the at least one tie-down cord; wherein said at least one unitary rigid positioner comprises at least one slide surface structured and arranged to assist slideability of the at least one looped portion with respect to said at least one unitary rigid positioner; wherein said at least one unitary rigid positioner comprises at least one support structured and arranged to be removably supported by the at least one fixed longitudinal rail portion; and wherein said at least one support is structured and arranged to be horizontally-positionable by the lasher to a lasher-selected position.

Figure 16:
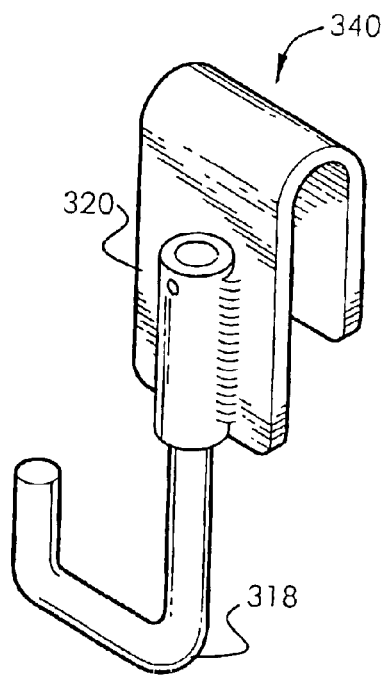
FIG. 16 is a perspective view of a lashing assembly comprising a swivel hook, according to another preferred embodiment of the present invention.

FIG. 16 is a perspective view of a lashing assembly comprising a swivel hook, according to another preferred embodiment of the present invention. FIG. 16 illustrates a swivel hook-type lashing assembly 340. Preferably, rigid support member 320 of swivel hook lashing assembly 340 comprises components and materials essentially similar to those described in the embodiment of FIG. 3; however, in the embodiment of FIG. 16, rigid cord-positioning member 318 is pivotally-mounted to rigid support member 320, as shown. The swivel hook lashing assembly 340 shown in FIG. 16 is particularly useful for insertion into, for example, narrow spaces (such as a very narrow corridor between the peripheral edge of a flatbed trailer and the adjacent side rail) prior to re-swivel and use. Those skilled in the art, upon reading the teachings of this specification, will appreciate that, under appropriate circumstances, considering such issues as accommodation for different sizes or arrangements of narrow spaces, etc., other arrangements of swivel hook lashing assembly 340, such as different sizes or shapes of swivel hook, different swivel-mechanisms (such as spring-loaded), etc., may suffice.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A lashing system for use by a lasher with at least one tie-down cord on an open-bed cargo transport system having at least one fixed side rail peripheral portion, the system comprising, in combination:
   a) unitary rigid positioner means for finely positioning at least one looped portion of the at least one tie-down cord;
   b) wherein said positioner means comprises slide means for assisting slideability of the at least one looped portion with respect to said positioner means; and
   c) wherein said positioner means further comprises horizontally-lasher-positionable support means for removable support of said positioner means by the at least one fixed side rail peripheral portion.

2. The lashing system according to claim 1 wherein said positioner means comprises blocker means for blocking upward movement, with respect to said positioner means, of the at least one looped portion of the at least one tie-down cord.

3. A tarpaulin lashing system for use by a lasher with at least one tie-down cord on an open-bed cargo transport system having at least one fixed side rail peripheral portion, the system comprising, in combination:
   a) at least one unitary rigid positioner structured and arranged to firmly position at least one looped portion of the at least one tie-down cord;
   b) wherein said at least one unitary rigid positioner comprises at least one slide surface structured and arranged to assist slideability of the at least one looped portion with respect to said at least one unitary rigid positioner;
   c) wherein said at least one unitary rigid positioner comprises at least one support structured and arranged to be removably supported by the at least one fixed side rail peripheral portion; and
   d) wherein said at least one support is structured and arranged to be horizontally-positionable by the lasher to a lasher-selected position.

4. The tarpaulin lashing system according to claim 3 wherein said at least one unitary rigid positioner comprises at least one blocker structured and arranged to block upward movement, with respect to said at least one unitary rigid positioner, of the at least one looped portion of the at least one tie-down cord.

5. The tarpaulin lashing system according to claim 4 wherein said at least one support comprises:
   a) at least one essentially U-shaped plate;
   b) wherein said at least one essentially U-shaped plate is structured and arranged to fit over the top of the at least one fixed side rail peripheral portion.

6. The tarpaulin lashing system according to claim 5 wherein said at least one blocker comprises at least one substantially vertical bar.

7. The tarpaulin lashing system according to claim 6 wherein said at least one substantially vertical bar is weldably attached to at least one exterior surface of said at least one essentially U-shaped plate.

8. The tarpaulin lashing system according to claim 7 wherein said at least one essentially U-shaped plate and said at least one substantially vertical bar are comprised primarily of metal.

9. The tarpaulin lashing system according to claim 8 wherein said metal comprises primarily steel.

10. The tarpaulin lashing system according to claim 8 wherein said metal is primarily non-ferrous.

11. The tarpaulin lashing system according to claim 6 wherein said at least one essentially U-shaped plate and said at least one substantially vertical bar are formed from a single plate.

12. The tarpaulin lashing system according to claim 11 wherein said single plate is primarily metal.

13. The tarpaulin lashing system according to claim 6 wherein said at least one essentially U-shaped plate and said at least one substantially vertical bar are molded as one unit.

14. The tarpaulin lashing system according to claim 13 wherein said at least one essentially U-shaped plate and said at least one substantially vertical bar are comprised of metal.

15. The tarpaulin lashing system according to claim 14 wherein said at least one essentially U-shaped plate and said at least one substantially vertical bar are comprised primarily of steel.

16. The tarpaulin lashing system according to claim 14 wherein said metal is primarily non-ferrous.

17. The tarpaulin lashing system according to claim 13 wherein said at least one essentially U-shaped plate and said at least one substantially vertical bar are comprised primarily of plastic.

18. The tarpaulin lashing system according to claim 6 wherein:
   a) said at least one essentially U-shaped plate and said at least one substantially vertical bar are comprised of at least two separate materials; and
   b) said at least one essentially U-shaped plate and said at least one substantially vertical bar are joined to form a unitary structure.

19. The tarpaulin lashing system according to claim 18 wherein at least one portion of said at least one essentially U-shaped plate is comprised primarily of plastic.

20. The tarpaulin lashing system according to claim 6 wherein:
   a) at least one lower portion of said at least one substantially vertical bar comprises said at least one slide surface; and
   b) said at least one slide surface is essentially rounded.

21. The tarpaulin lashing system according to claim 6 wherein at least one lower surface portion of said at least one substantially vertical bar forms a right round cylinder.

22. The tarpaulin lashing system according to claim 6 wherein at least one lower portion of said at least one substantially vertical bar comprises at least one essentially U-shaped hook.

23. The tarpaulin lashing system according to claim 3 further comprising at least one fixed side rail.

24. The tarpaulin lashing system according to claim 23 further comprising at least one flat-bed trailer attached with said at least one fixed side rail.

25. The tarpaulin lashing system according to claim 24 further comprising at least one tarpaulin having at least one tarpaulin cord system.

26. The tarpaulin lashing system according to claim 25 further comprising at least one truck tractor attached with said at least one flat-bed trailer attached with said at least one fixed side rail.

27. A tarpaulin lashing system for use by a lasher with at least one tie-down cord on an open-bed cargo transport system comprising at least one fixed longitudinal rail portion, the system comprising, in combination:
   a) at least one unitary rigid positioner structured and arranged to firmly position at least one looped portion of the at least one tie-down cord;
   b) wherein said at least one unitary rigid positioner comprises at least one slide surface structured and arranged to assist slideability of the at least one looped portion with respect to said at least one unitary rigid positioner;
   c) wherein said at least one unitary rigid positioner comprises at least one support structured and arranged to be removably supported by the at least one fixed longitudinal rail portion; and
   d) wherein said at least one support is structured and arranged to be horizontally-positionable by the lasher to a lasher-selected position.

* * * * *

UNITED STATES PATENT AND TRADEMARK OFFICE
CERTIFICATE OF CORRECTION

PATENT NO.    : 6,783,312 B2
DATED         : August 31, 2004
INVENTOR(S)   : Smith, Charles R.

It is certified that error appears in the above-identified patent and that said Letters Patent is hereby corrected as shown below:

Column 11,
Line 57, "finely" should read -- firmly --

Signed and Sealed this

Fifteenth Day of February, 2005

JON W. DUDAS
*Director of the United States Patent and Trademark Office*

UNITED STATES PATENT AND TRADEMARK OFFICE
CERTIFICATE OF CORRECTION

PATENT NO. : 6,783,312 B2
DATED : August 31, 2004
INVENTOR(S) : Smith, Charles R.

It is certified that error appears in the above-identified patent and that said Letters Patent is hereby corrected as shown below:

Column 11,
Line 57, "finely" should read -- firmly --

Signed and Sealed this

Twenty-second Day of February, 2005

JON W. DUDAS
*Director of the United States Patent and Trademark Office*